US009070402B2

(12) United States Patent
Burtnyk et al.

(10) Patent No.: US 9,070,402 B2
(45) Date of Patent: Jun. 30, 2015

(54) 3D MODEL PRESENTATION SYSTEM WITH MOTION AND TRANSITIONS AT EACH CAMERA VIEW POINT OF INTEREST (POI) WITH IMAGELESS JUMPS TO EACH POI

(75) Inventors: Nicolas Alexandre Burtnyk, Toronto (CA); Azam Khan, Aurora (CA); George William Fitzmaurice, Toronto (CA); Gordon Paul Kurtenbach, Toronto (CA)

(73) Assignee: AUTODESK, INC., San Rafael, CA (US)

( * ) Notice: Subject to any disclaimer, the term of this patent is extended or adjusted under 35 U.S.C. 154(b) by 1502 days.

(21) Appl. No.: 11/373,159

(22) Filed: Mar. 13, 2006

(65) Prior Publication Data

US 2007/0211149 A1 Sep. 13, 2007

(51) Int. Cl.
| | |
|---|---|
| G06F 3/048 | (2013.01) |
| G11B 27/034 | (2006.01) |
| G11B 27/10 | (2006.01) |
| G11B 27/34 | (2006.01) |
| G06T 15/20 | (2011.01) |

(Continued)

(52) U.S. Cl.
CPC ............ *G11B 27/034* (2013.01); *G11B 27/105* (2013.01); *G11B 27/34* (2013.01); *G06T 15/20* (2013.01); *G06T 19/003* (2013.01)

(58) Field of Classification Search
CPC .......................... G06F 3/04845; G06F 3/04815
USPC .......................... 715/716, 838, 721, 848, 964
See application file for complete search history.

(56) References Cited

U.S. PATENT DOCUMENTS

| 4,282,546 A | 8/1981 | Reitmeier |
| 5,276,785 A | 1/1994 | Mackinlay et al. |

(Continued)

OTHER PUBLICATIONS

Nicholas Burtnyk et al., "ShowMotion—Camera Motion based 3D Design Review", Association for Computing Machinery, Mar. 14, 2006.

(Continued)

*Primary Examiner* — Nicholas Augustine
(74) *Attorney, Agent, or Firm* — Artegis Law Group, LLP

(57) ABSTRACT

An interactive 3D presentation system that utilizes a collection of shots or motion views where each shot can include a combination of a camera view and camera action. A visual transition, such as a fade, can be presented at the end and beginning of sequential shots. Between the end point of a first shot and the beginning of a sequential shot, the scene is not shown. The system allows interactive authoring and/or viewing a 3D visual experience composed by defining a collection of shots where each shot is a combination of a camera view point of interest (POI) plus a camera motion path. The POI is placed on the path in a variety of ways where it can be at the beginning, in the middle or at the end of the path. A collection of predefined, cinematically styled camera motion paths, such as a crane and track shots, can be made available to the author. The pacing and duration of each shot can be adjusted. A graphical user interface showing the scene is provided and includes thumbnails of the POI or sets of POIs where the user can select a thumbnail to play an associated shot or set. The interface allows for the arrangement and ordering of shots to be used in a presentation. The system allows a shot to be retrieved from a collection of shots by indexing the 3D locations of each shot's camera path and using this index to find the nearest neighbors to a user specified mouse cursor position. Variations in the scene can also be selected using the interface.

30 Claims, 14 Drawing Sheets

(51) Int. Cl.
*G06T 19/00* (2011.01)
*G06F 3/00* (2006.01)

(56) References Cited

U.S. PATENT DOCUMENTS

| | | | |
|---|---|---|---|
| 6,028,584 A | 2/2000 | Chiang et al. | |
| 6,091,422 A | 7/2000 | Ouaknine et al. | |
| 6,121,966 A * | 9/2000 | Teodosio et al. | 715/838 |
| 6,144,375 A | 11/2000 | Jain et al. | |
| 6,204,850 B1 | 3/2001 | Green | |
| 6,240,421 B1 * | 5/2001 | Stolarz | 1/1 |
| 6,271,855 B1 | 8/2001 | Shum et al. | |
| 6,346,938 B1 | 2/2002 | Chan et al. | |
| 6,466,254 B1 | 10/2002 | Furlan et al. | |
| 6,563,529 B1 * | 5/2003 | Jongerius | 348/36 |
| 6,795,972 B2 | 9/2004 | Rovira | |
| 7,096,428 B2 * | 8/2006 | Foote et al. | 715/721 |
| 7,299,417 B1 * | 11/2007 | Barris et al. | 715/719 |
| 7,411,594 B2 * | 8/2008 | Endo et al. | 345/633 |
| 7,788,323 B2 * | 8/2010 | Greenstein et al. | 709/204 |
| 2004/0085335 A1 * | 5/2004 | Burlnyk et al. | 345/716 |
| 2004/0210852 A1 | 10/2004 | Balakrishnan et al. | |
| 2008/0235320 A1 * | 9/2008 | Joy et al. | 709/201 |

OTHER PUBLICATIONS

Dennis et al., Assisted Navigation for Large Information Spaces, IEEE, Oct. 2002, pp. 419-426.

Zeleznik et al. "Two Pointer Input for 3D Interaction", ACM, 1997, pp. 115-120.

Khan, Azam et al., "Interaction: HoverCam: interactive 3D navigation for proximal object inspection", Proceedings of the 2005 symposium on interactive 3D graphics and games, Apr. 2005.

Tsang, et al., "Game-Like Navigation and Responsiveness in non-game applications", Communications of the ACM, Jul. 2003, vol. 46, No. 7, pp. 56-61.

Hanson, et al., Constrained Navigation Environments, Dagstuhl, 1997, pp. 95-104.

Hanson, Andrew et al., "Constrained 3D Navigation with 2D Controllers", Computer Science Department, Indiana University, Bloomington, IN, 9pp, IEEE, Visualization $8^{th}$ Conference, Oct. 1997, pp. 175-183.

Burtnyk, Nicholas et al., "StyleCam: Interactive Stylized 3D Navigation using Integrated Spatial & Temporal Control", Letters CHI, vol. 4, Issue 2, Oct. 2002, pp. 101-110.

Office Action mailed Oct. 4, 2005 in U.S. Appl. No. 10/287,816.

Final Office Action mailed May 18, 2006 in U.S. Appl. No. 10/287,816.

Interview Summary Record of Aug. 18, 2006 in U.S. Appl. No. 10/287,816.

Office Action mailed Dec. 29, 2006 in U.S. Appl. No. 10/287,816.

Final Office Action mailed Jun. 19, 2007 in U.S. Appl. No. 10/287,816.

Office Action mailed Apr. 9, 2008 in U.S. Appl. No. 10/287,816.

Office Action mailed Jan. 27, 2009 in U.S. Appl. No. 10/287,816.

Notice of Allowance and Fee(s) Due mailed Jun. 22, 2009 in U.S. Appl. No. 10/287,816.

Issue Notification mailed Aug. 26, 2009 in U.S. Appl. No. 10/287,816.

* cited by examiner

3D MODEL PRESENTATION SYSTEM WITH MOTION AND TRANSITIONS AT EACH CAMERA VIEW POINT OF INTEREST (POI) WITH IMAGELESS JUMPS TO EACH POI

CROSS-REFERENCE TO RELATED APPLICATION(S)

This application is related to U.S. application entitled 3D Scene Object Switching System having Ser. No. 11/327,373, by John V. Schrag et al., filed Jan. 9, 2006 and incorporated by reference herein.

BACKGROUND OF THE INVENTION

1. Field of the Invention

The present invention is directed to a system for interactively creating and presenting 3D shots where each shot includes a camera viewpoint of interest (POI) and camera path.

2. Description of the Related Art

Visual design reviews of three-dimensional (3D) models, such as a CAD model of an automobile, are an important tool for presenting to decision makers the aspects of new products. Conventional methods for performing such design reviews include slide shows or static views of desired points of interest (POIs) that limits the audience perception of the 3D quality of the model, user controlled real-time navigation about the model using conventional 3D scene navigation tools to present views of the POIs where duplication of the views from presentation to presentation is difficult, virtual turntables that allow the view to be rotated about the model but that may not include desired POIs, and bookmarks for the POIs with automatic or procedurally generated movement of the view or camera between the POIs where the view becomes a static view of each POI where time is spent presenting parts of the model that have low interest to the audience.

What is needed is a system that allows a presentation that does not have the limitations and drawbacks of the conventional approaches and that conveys to the audience the 3D quality of the model.

SUMMARY OF THE INVENTION

It is an aspect of the present invention to provide an audience a 3D viewing experience of a model where points of interest are highlighted, motion is included, cinematic qualities are provided and the presentation can be easily duplicated.

It is another aspect of the present invention to provide an interface that allows the presentation of shots in a desired sequence.

It is also as aspect of the present invention to allow the user to point to a 3D model and shots associated with the point can be played.

The above aspects can be attained by an interactive 3D presentation system that utilizes a collection of shots where each shot can include a combination of a camera view and camera action. The 3D presentation system can include a visual transition presented between shots. The system allows interactive authoring and/or viewing a 3D visual experience composed by defining a collection of shots where each shot is a combination of a camera view point of interest (POI) plus an additional camera motion path. The POI is attached to the camera motion path in a variety of ways where it can be at the beginning, in the middle or at the end of the specified motion path. A collection of predefined, cinematically styled camera motion paths are available to the author. Authors can adjust the pacing and duration of each shot. A sequencer interface is provided including thumbnails of the POI where viewers can select a thumbnail to experience an associated shot. The interface allows for the arrangement and ordering of shots to be used in a presentation. The system allows a shot to be retrieved from a collection of shots by indexing the 3D locations of each shot's camera path and using this index to find the nearest neighbors to a user specified mouse cursor position.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
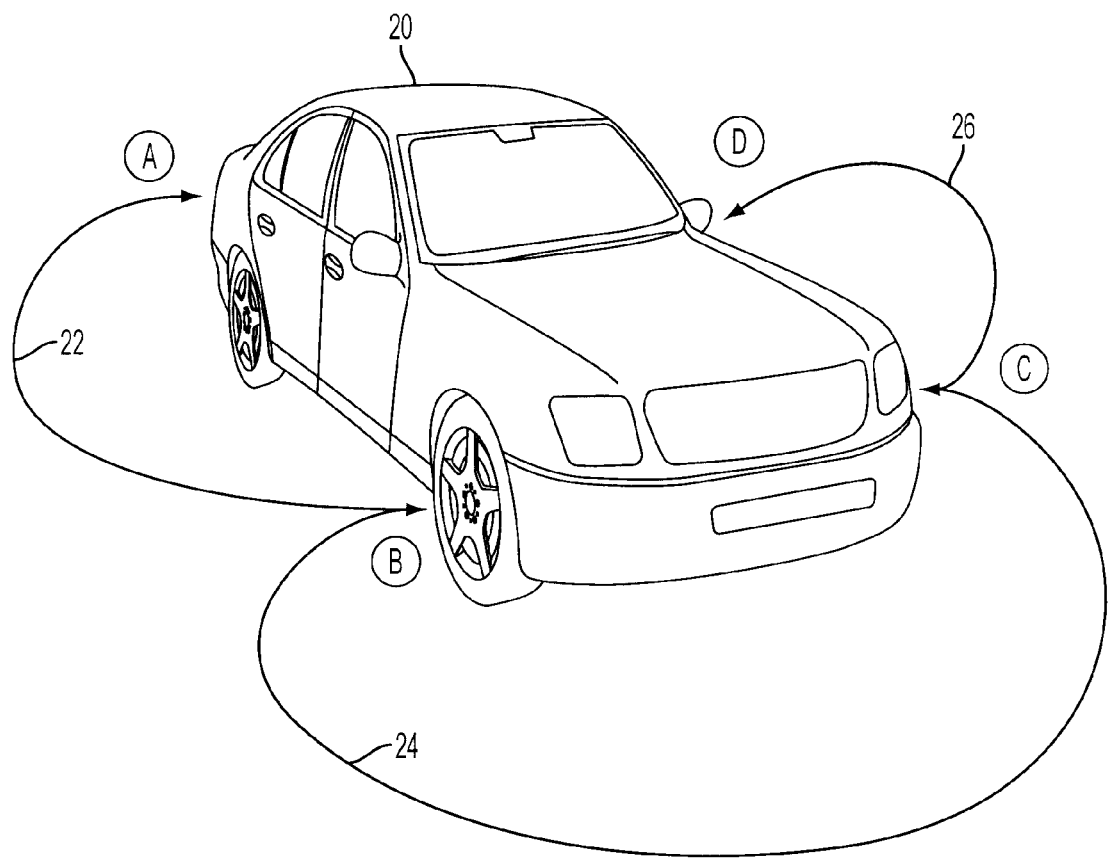
FIG. 1 depicts a conventional approach to a presentation.

In a conventional bookmark type presentation, the user bookmarks viewpoints for the model, such as automobile model 20, and points A-D of FIG. 1, say corresponding to the tail light, the right from wheel, the headlight and the left side mirror. A computer automatically determines paths 22-26 between the viewpoints A-D. A typical presentation as depicted in FIG. 1, would start with a view of the model at point A where the view of the model is static for some desired time period. At the end of the period, the view, or the camera, starts moving between points A and B along a predetermined computer generated path. During this motion the view is of the model as the motion goes between points A and B and so the audience might see the side of the car for some period of time before the audience sees the wheel at point B. When the view arrives at point B, the motion stops and the view is again static for some period of time. At the end of the static view period for point B, the view moves to point C, again showing the model between the points as the camera moves between the points and again stopping at point C. A similar camera "on" motion occurs between points C and D where again at point D the motion stops. Because the paths between the points are computed by the computer, the paths can sometimes produce undesired effects. For example, a path between points A and C might pass through the model 20 or take an unexpected path to the new position. The camera may also point at unexpected parts of the scene and disorient the viewer and confuse the scene context for the user.

Figure 2:
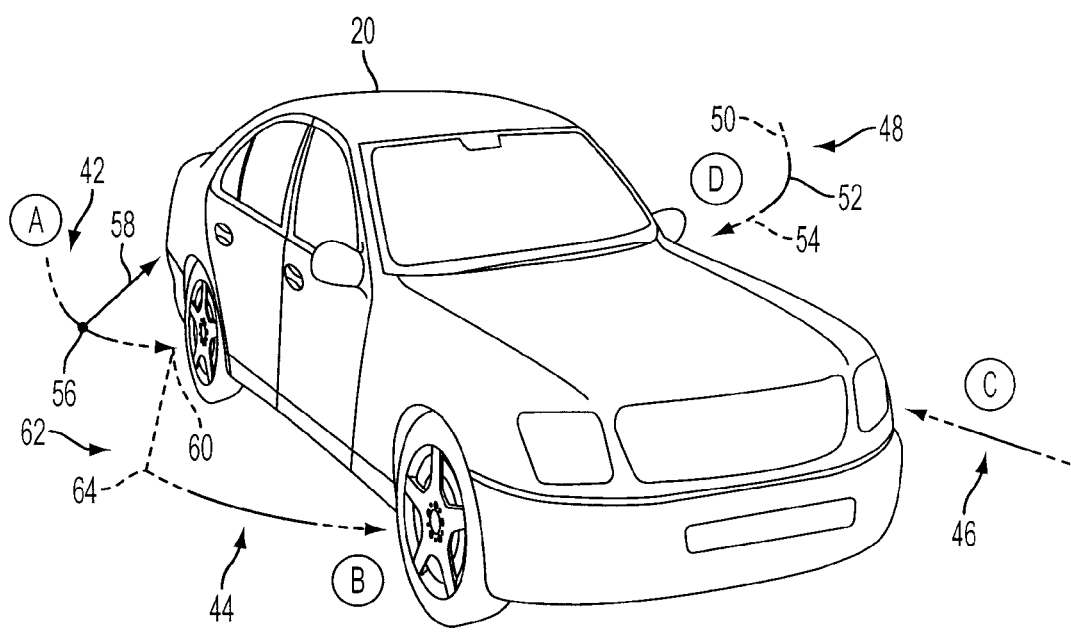
FIG. 2 shows aspects of a presentation according to the present invention.

In contrast, to the presentation approach discussed above, in the embodiments of the present invention, as depicted in FIG. 2, the camera or view moves in association with points-of-interest (POIs) along specified motion paths 42-48. Each motion path, for example path 48, includes an opening transition motion segment 50, such as fade-in, a full view motion segment 52 and a closing transition 54, such as a fade out. The particular view of the point-of-interest (POI) for a path, for example POI 56 of path 42, can be positioned along the full view segment at the beginning, middle or end, where 56 is positioned in the middle. At the POI, the camera or the particular view of the model can be specified by the user. For example, at POI 56 FIG. 2 illustrates the camera being pointed 58 toward the rear taillight of the model car 20. The paths 42-48 can be selected from among a collection or set of predefined (or pre-authored), cinematically, conventionally styled camera track and angle paths to convey cinematic type shots. A camera track and angle path includes a camera track for the position of the camera and a viewpoint direction. For example, a path could be a focus point sweep where the camera sweeps or moves past a POI, such as a center of a wheel, with the camera always pointed at the POI, such as always pointed at the center of the wheel. Other types of these convention shots include crane, zoom, track, spiral, etc. Other types of motions for the camera can be imported by the user and used as desired. The user can also draw a path for use in the system using conventional path drawing tools and specify the views of the scene or orientation of the camera pointing direction along the path using convention drawing and orientation specification tools. The initiation/start time, pacing and duration of each path can also be set by the user. For example, path 44 can move quickly at first and slow down toward the middle and speed up again toward the end. When the camera motion along path 44 is complete, the start of path 46 could be immediate or there could be a pause before the camera starts along path 48. When the end of a path is reached, such as path end point 60, a jump 62 occurs to the start point 64 of the next path. During this jump, the camera is not "on" such that a view of the model is not provided or there is a "cut" from the end of the one shot to the beginning of the next shot so that the transition is viewless.

Figure 3:
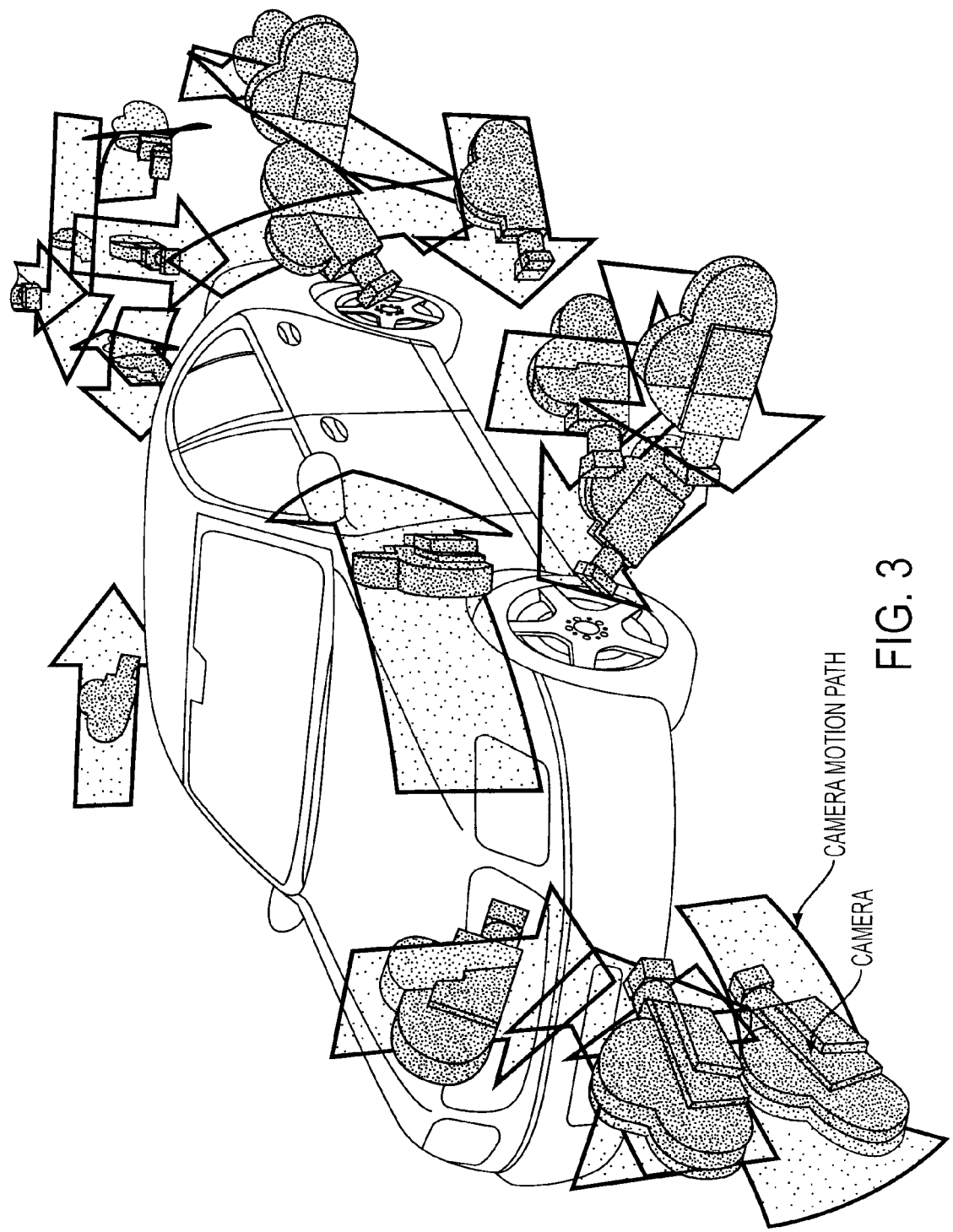
FIG. 3 depicts examples of shots that can be created for a model.

FIG. 3 depicts examples of pre-authored shots that can be used on a model showing the direction that the camera is pointing and the motion path of the camera. These shots include zoom-in, zoom-out, crane up, straight track, curved track, and sweep.

Figure 4:
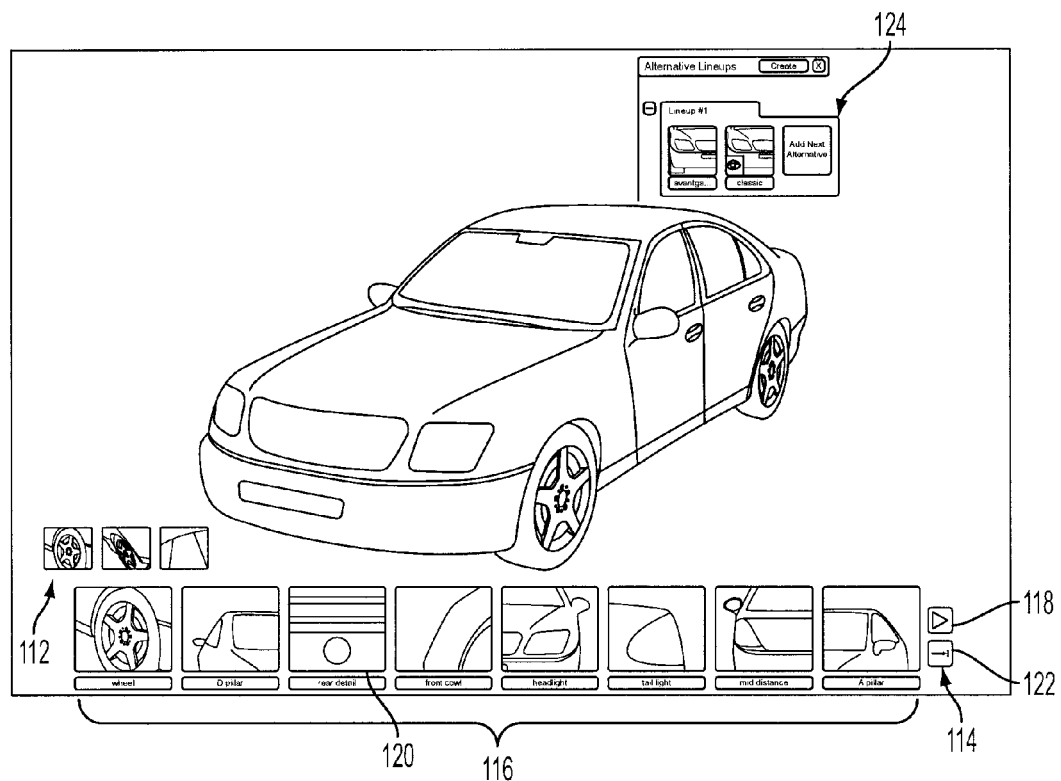
FIG. 4 depicts an interface used for presentations.

The present invention includes an authoring mode, used to setup a design review environment, and a viewing mode in which users interact with the constructed environment to conduct a design review. The main entities that users author and interact with are: shots, transitions, shot sets, variations, and searches. FIG. 4 depicts a shot sequencer interface 110 showing shots 112, play and loop controls 114 and a shot set selector 116 including a set of shots displayed in a row along the bottom of the screen. A set of variations 124, to be discussed in more detail later herein, is also shown The concept of a shot is from cinematography. It is simply a visual sequence of camera motion that runs for a short period of time, typically from 3 to 10 seconds. Predefined shot types can be made available which simplifies authoring and provides high quality camera movements. In addition to these predefined camera movements, custom camera movement paths can be imported from other 3D animation software packages, such as Alias's Maya animation application. Still images are also possible, as are camera movements based on specifying starting and ending camera positions. Table 1 summarizes the properties required to set up a shot.

TABLE 1

Shot authoring properties for 4 shot types.
Shot Authoring Properties

| Shot Type | Camera Movement | Current Camera used as: | Duration | Speed |
|---|---|---|---|---|
| Predefined | Zoom in<br>Zoom out<br>Track left<br>Track right<br>Crane up + left<br>Crane up + right<br>Crane down + left<br>Crane down + right | Starting Point<br>Half-way Point<br>Ending Point | Specify in seconds | Adjustable |
| Still | None | Viewpoint | N/A | |
| Keyframe | Interpolated between Start and End Point | Starting Point/ Ending Point | N/A | |
| Imported motion | Any imported motion path | N/A | Adjustable | Adjustable |

To create a shot using a predefined shot type, the author positions the 3D camera using standard tumble/pan/zoom camera controls, selects the type of shot to be created, its duration, speed, and other properties. Depending on the type of shot being created, the system uses the current camera position as the start, halfway, or end position of the camera in the shot. Once a shot has been created, a thumbnail of the first frame is presented in the shot selector at the bottom of the screen, as in FIG. 4.

Figure 5:
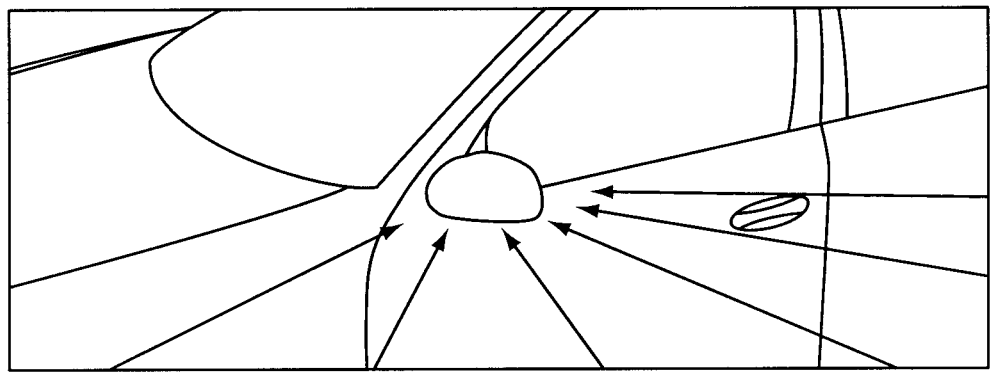
FIGS. 5 and 6 depict types of camera orientations during a shot.
Figure 6:
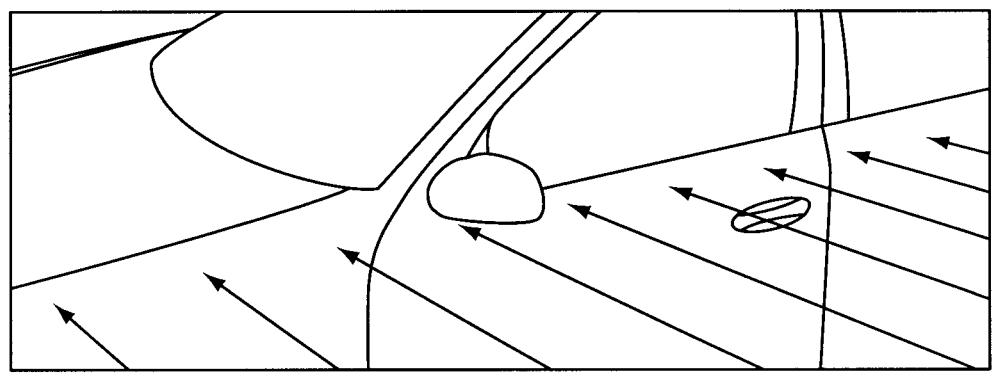

Shots can have several classes of look-at behavior (view type): fixed point (a fixed target, while the camera moves along the side of the car, see FIG. 5), fixed direction (a moving target, see FIG. 6), or variable defined by a specified path curve and camera pointing direction curve where such a curve may be imported by the user or created as needed (for example, an s-shaped path with the camera looking up along the car roof line and then down along the lower side panel).

The shot selector 110 allows the shots to be played back in a left to right sequence by pressing a "play" button 118 of the controls 114 or accessed randomly by clicking on a shot thumbnail, such as the thumbnail 120 of the rear detail. A loop toggle button 122 allows a shot set or the entire shot collection to be repeatedly played. At any time, users can click-on a stop button to pause shot playback.

Figure 7:
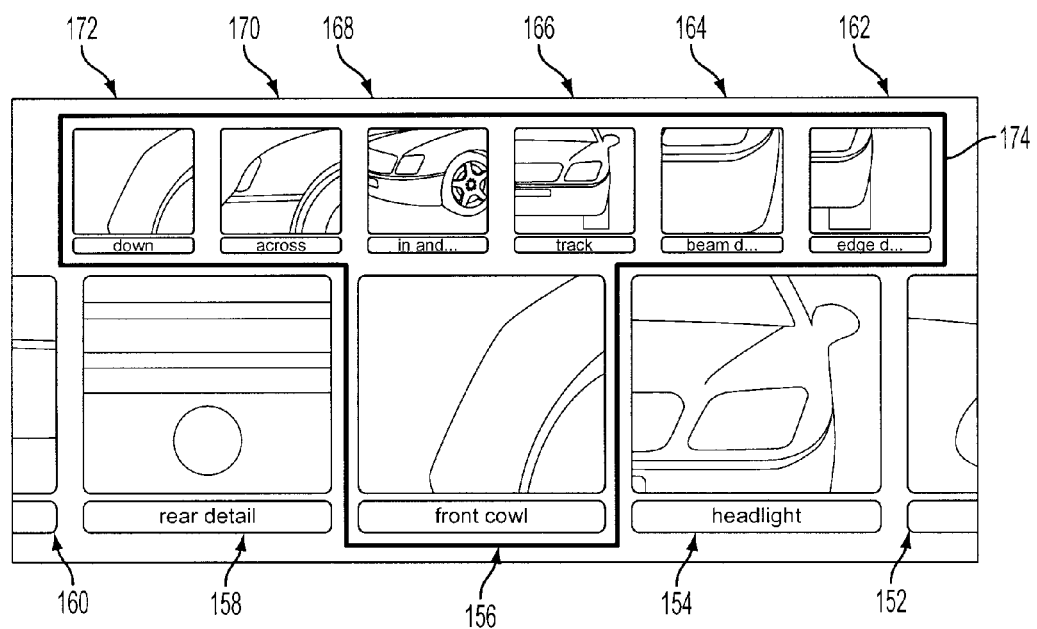
FIG. 7 shows a shot thumbnail and images from the shot sequence.

As noted above, the invention has the ability to group shots into sets 116 (FIG. 4). This feature is used to group related shots together. For example, in an automotive design there may be many shots for each design feature, such as the headlights, grill, taillight, etc. A shot set provides a rich set of viewings of a particular design feature that can be easily invoked. Clicking on the thumbnail associated with a set causes that whole shot set to be played back in sequence. Shots within a set can also be played individually by clicking on their associated thumbnail. As depicted in FIG. 7 (an the enlarged version of a portion of FIG. 4), the large thumbnails 152-160 in the bottom row represent shot sets. The smaller thumbnails 162-172 in the top row represent shots within the current set. An outline 174, typically a highlighting color such as in red, encircles the selected set thumbnail 156 with its shots 162-172.

As discussed previously, transitions between shots are provided. Transitions can be any of the conventional types of transitions used in the cinema, such instant (a "cut") and a gradual fade to the next shot (a "fade-to"). Other transition types are possible, such as a panel slide, and at least two types should be provided for variety. The author can specify the duration of a transition. The fade-to transition can overlap the end of the previous shot and the beginning of the following shot. In this transition, for the first half of the fade, the view is incrementally mixed with black over time until the frame is completely black. Then, over the next shot, during the second half of the fade, the process is reversed until there is no black overlay in the frame. In particular, the fade-to transitions are preferably implemented by overlaying a black, screen-aligned quad and varying its opacity over the course of the transition.

Figure 8:
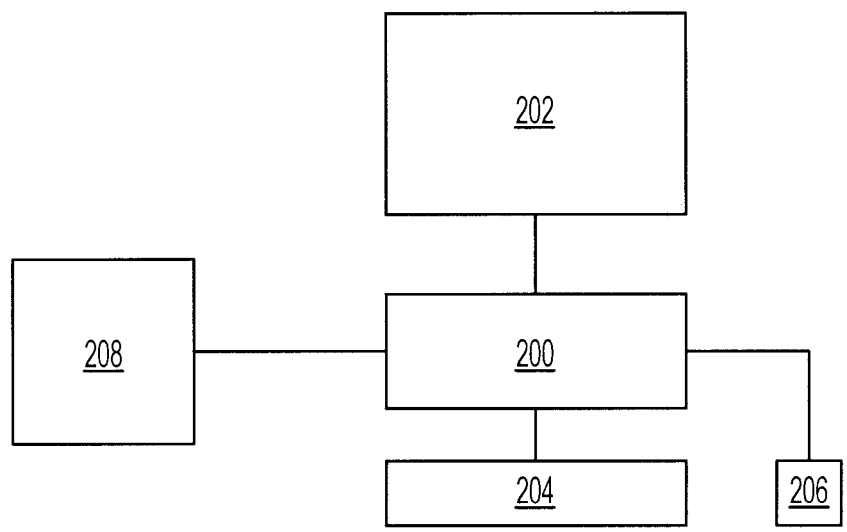
FIG. 8 illustrates hardware of the present invention.

The present invention can be implemented on a high-performance personal computer type machine 200 (see FIG. 8) running Windows XP with a dual-core AMD Athlon X2 processor at 2.2 GHz, 2 GB of DDR400 RAM and two NVidia GeForce 7800 GTX graphics cards in an SLI configuration, a conventional high resolution display 202 and I/O devices such keyboard 2004 and 2006. The system, when a presentation is being presented, can also drive a conventional large format display system 208, such as a projector or a window wall. The system preferably can be written in C++ and Python and make use of OpenSceneGraph and OpenGL to achieve high levels of performance.

Figure 9:
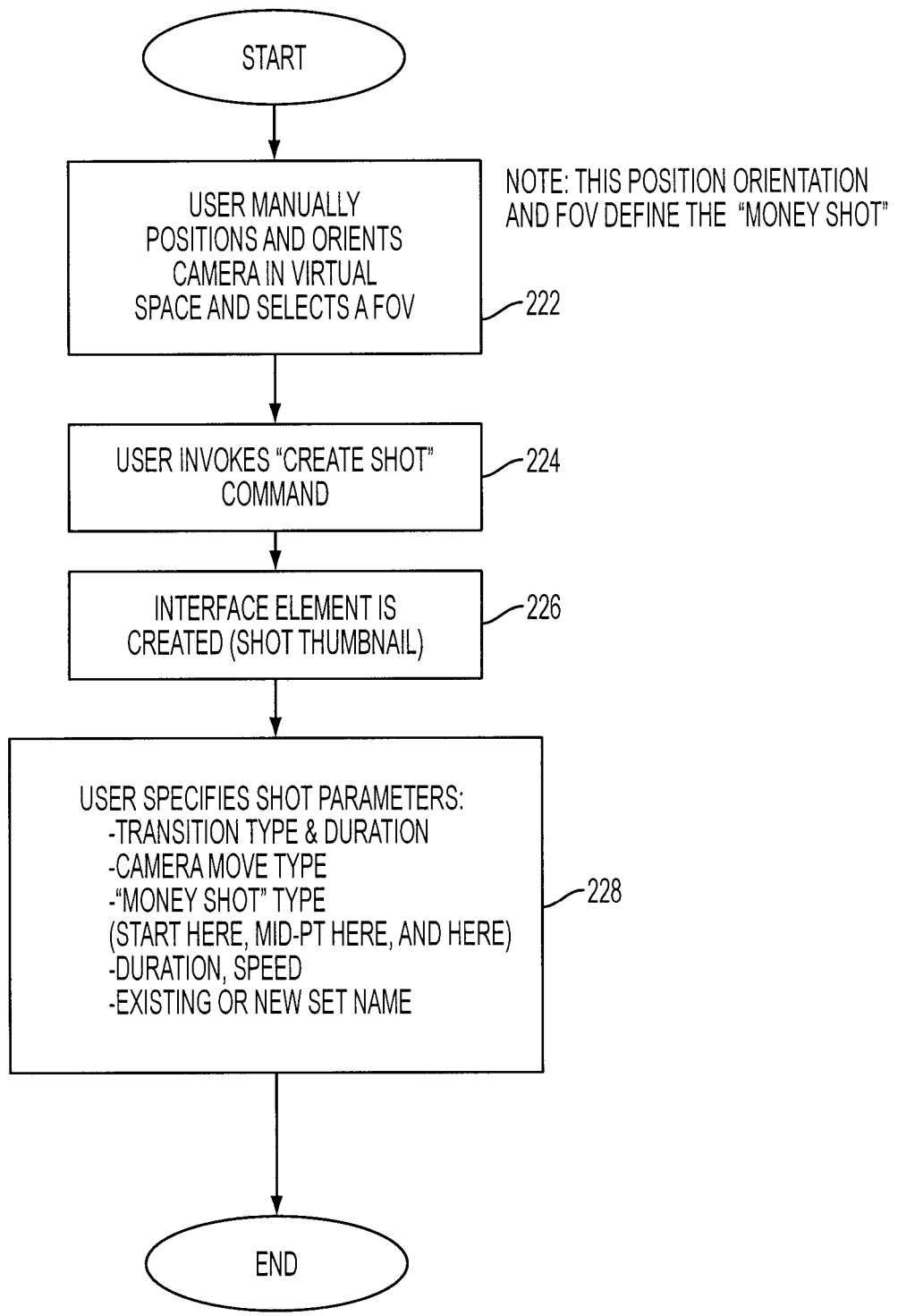
FIG. 9 shows the user process of creating a shot.

FIG. 9 shows the flow of operations that occur when creating a shot. Initially the user manually positions 222 the camera or view in the virtual space and selects a field of view (FOV). The user then activates 224 the create-shot command and the system saves the current "view" of the camera and uses the current view to create 226 the thumbnail image for the shot. The user then sets 228 and the system saves the specifics of the shot, including selecting the type of transition and its duration, designates the camera move type (track, zoom, crane, etc.). The user also selects the "money shot", which are the views through which the camera must move during the shot motion and this includes indicating where the money shot starts (and its view), where various intermediate points (and views) are located and where the shot (and its view) ends. The duration and speed of the shot are also set along with giving the shot a name.

Figure 10:
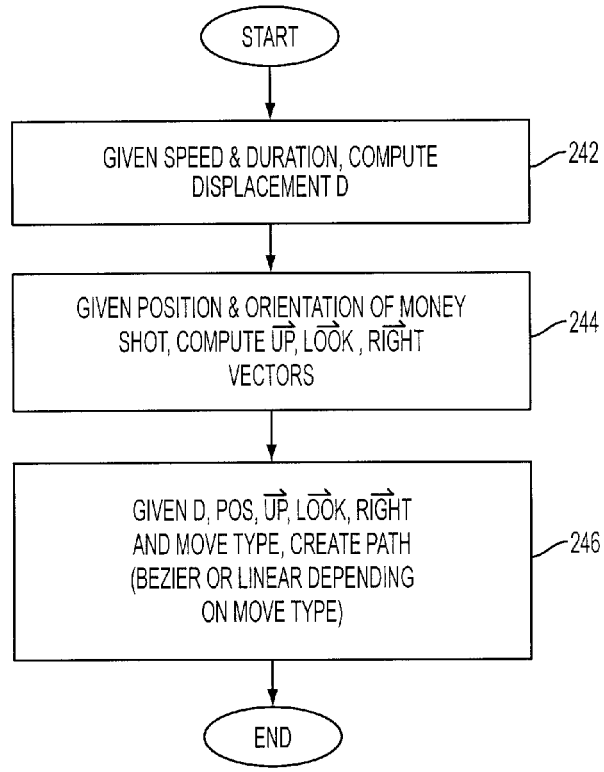
FIGS. 10 and 11 depict system shot creation operations.

After the user has performing the operations shown in FIG. 9, the system performs the operations of FIG. 10 to create a shot based on the user input. The system first determines 242 the displacement (or distance traveled) of the shot from the speed and duration. With the money shot, the system determines 244 the relative vectors of the shot, such as the vector that designates the up direction in the scene, the vector that designates the look direction and the vector that designates a right hand direction in the scene relative to the look direction. The system then determines 246 the path of the camera from the displacement, the current camera position, the up, look-at and right vectors, and the move type. For curved path type shots, preferably, a Bézier path is created at a position relative to the camera's world space position when the shot is created. This path defines the position of the virtual camera in space over the duration of the shot. Camera movement for curved paths is achieved during playback by evaluating the Bézier path at the current time. For linear type paths, such as a zoom, a linear path is created as depicted in FIG. 11.

Figure 11:
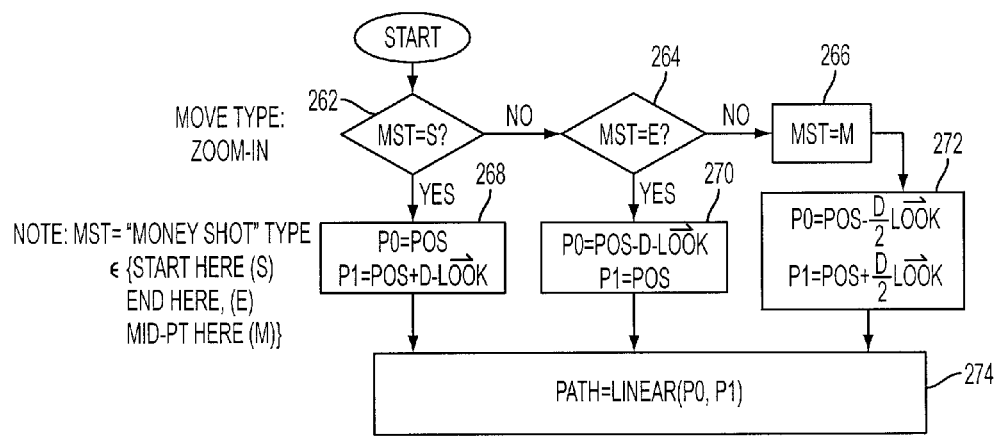

FIG. 11 particularly illustrates the operations for creating a linear zoom-in type shot. The system begins evaluation by examining 262-264 the points of the money shot type (MST). For the start point money shot type (S), the beginning point (P0) is set 268 to the current position (pos) and the end point (P1) is set to pos+the displacement times the look-at vector (D*Look). For the end point shot type (E), P0 is set 270 to pos−D*Look and P1 is set to pos. For the in-between or mid-point money shot type (M), P0 is set 272 to pos−D/2 Look and P1 is set to pos+D/2 Look. The path is then conventionally linearly computed 274.

Figure 12:
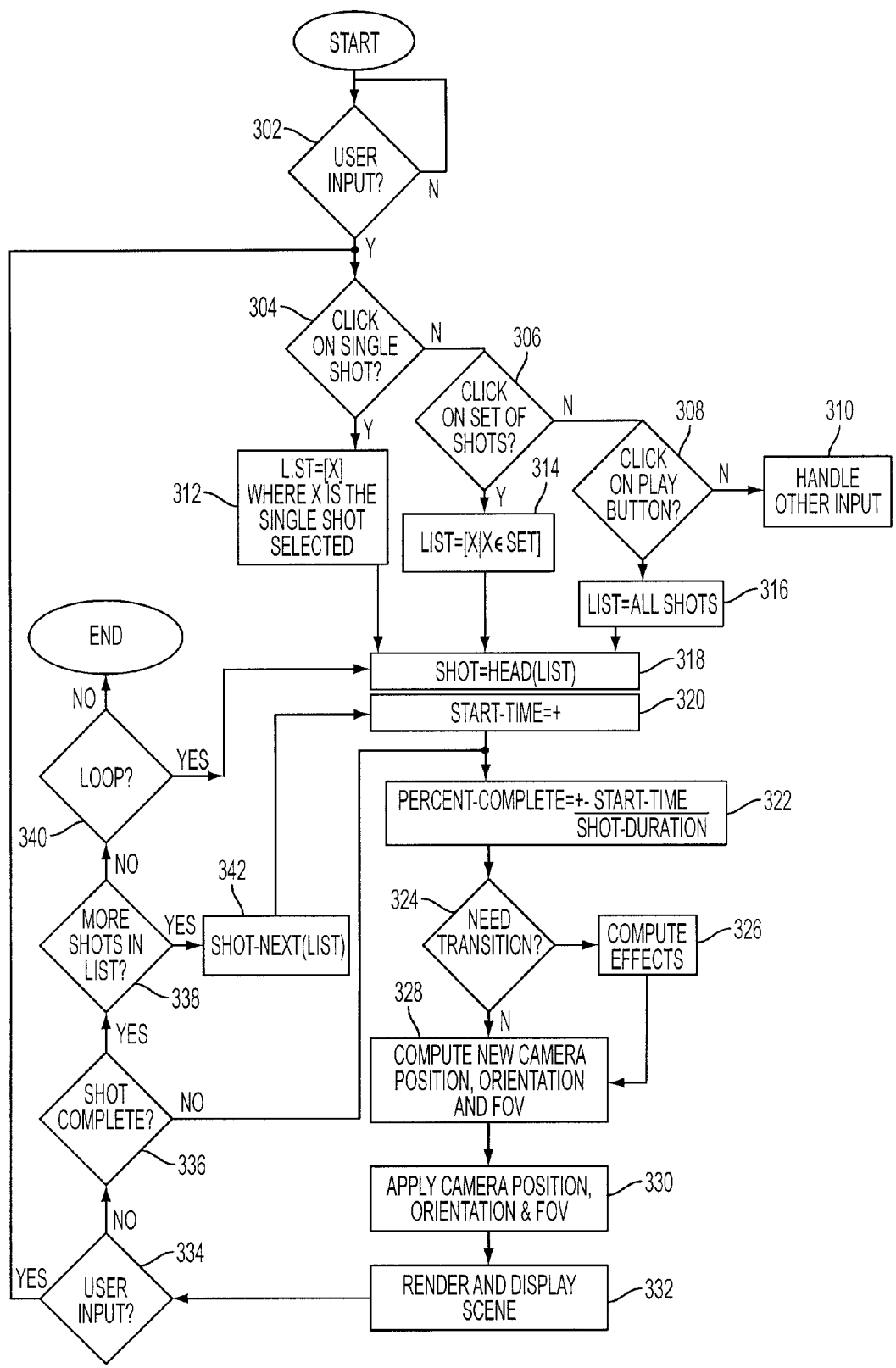
FIGS. 12 and 13 show shot playback operations.

The playback mode, as depicted in FIG. 12, looks 302 for a user input and determines 304-308 the type of input and if a shot is not selected this other type of input is handled 310 elsewhere. When the input is a single shot selection, the single shot selected is loaded 312 into a list of shots to be played, when a set is selected, the set is loaded 314 into the list and when the play button is selected all the shots are placed 316 in the list. The shot to be played then points 318 to the head of the list and the start time is set 320. The percent complete of the shot is then calculated 322. Next, the system determines 324 whether the current time is the time for a transition. If so, the transition effect is computed 326. A new camera position is computed 328 (see FIG. 13) along with the camera orientation and field of view (FOV). The new position etc. is applied 330 and the view is rendered and displayed 332. The system then runs through tests for new user input 334, whether the shot is complete 336, whether more shots are on the list 338 and whether the system is in a loop mode 340. When the shot is not complete the current time is updated and playback continues. When the end of the shot has been reached and there are other shots on the list, the next shot is retrieved and the shot start time is set 320. When the mode is a loop mode and the end of the list has been reached, the shot is set 318 to the head of the list.

Figure 13:
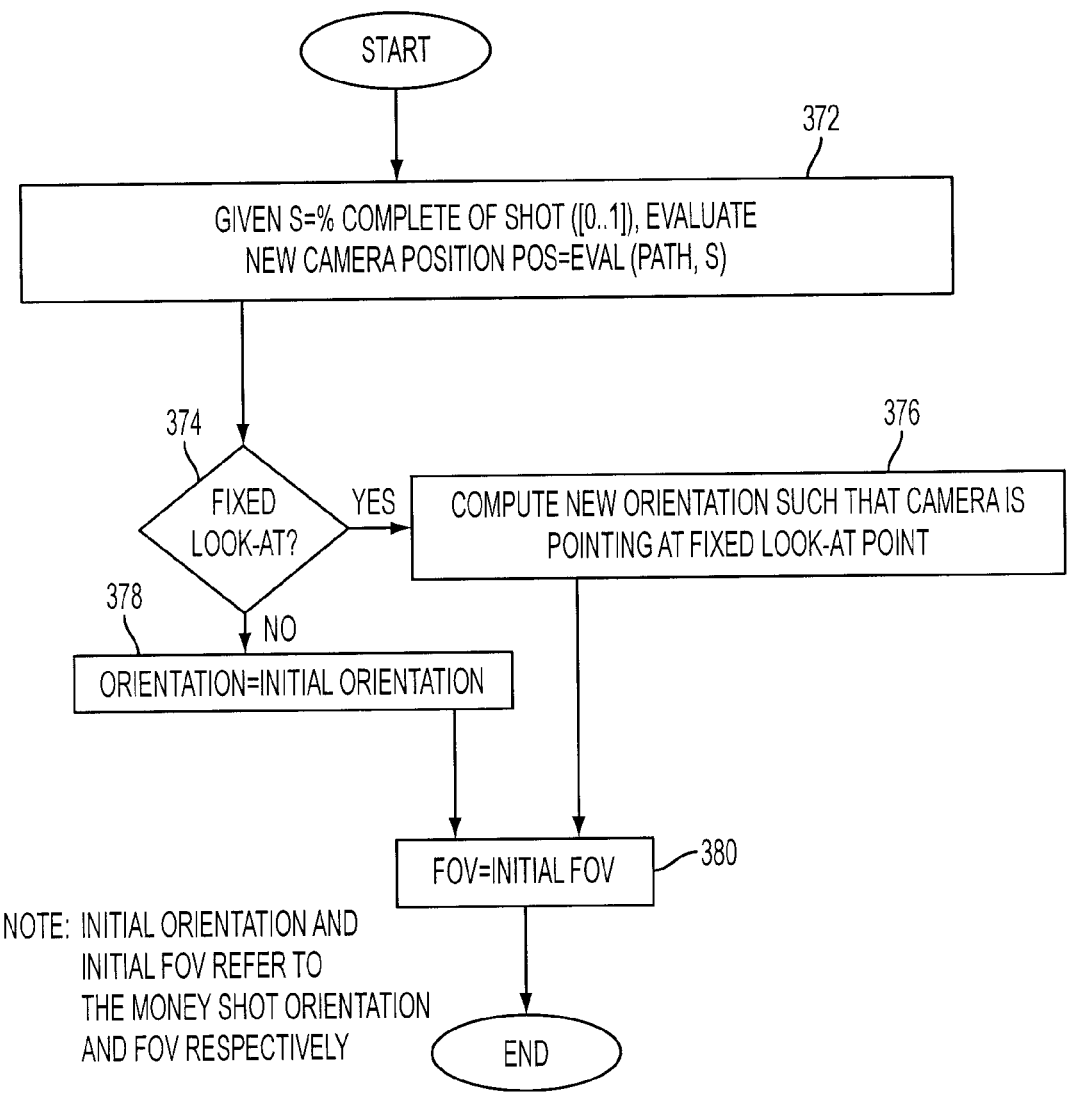

FIG. 13 depicts the operations that occur during the computation of a new camera position, orientation and FOV. Based on the percent complete, s, the percent or position along the path based on the percent is determined The system then checks 374 on the type of orientation ("look-at" see FIGS. 5 and 6) that has been set. If the type is fixed, the camera is oriented 376 to point at the fixed point. Otherwise the orientation is 378 the original orientation. The field of view is set 380 to the initial FOV.

In design reviews, comparing different designs is a desirable and common activity. Typically, several designs are viewed "side by side" so a design can be easily compared. Another comparison technique is serial presentation. While having the disadvantage of not being able to view the two designs simultaneously, it has the benefits of being able to view design variations from an identical viewpoint. The present invention provides for both of these activities within the context of camera based motion viewing.

The invention allows designers to construct a set of design alternatives and automatically switch between them using the 3D Scene Object Switching System previously mentioned. For example, in FIG. 4, an auto design is shown with a set of alternate designs or variations 124 for the wheels, grills, and trim. These alternatives were constructed by a designer by creating the needed geometry and material properties, then grouping sets of these objects into particular design alternatives. When a button for a particular alternative is selected, the other alternatives in the set are hidden from view and the selected alternative is displayed. Using this, a designer can cycle through design alternatives evaluating their appearance.

The system can be configured so that alternatives can be changed while a shot or set is being played. For example, a designer can watch the "wheel" shot sequence, three times over, each time switching to an alternate design between sequences, or in the middle of a sequence, as desired. In this way a designer can have a rich set of viewings of each alternate design in a rapid, identical and reproducible way.

The invention supports "side by side" comparisons. For example, system screens can be split into two views with duplicate designs on either side. Then alternate designs can be selected for either model, allowing side-by-side comparison. The viewpoints of these two views are linked such that camera movements in one view are automatically applied to the other view. This allows identical manual review of objects. Additionally, a shot or set playback updates both views allowing for a rich set of viewings of the two different designs simultaneously in a "side by side" manner.

The present invention, as discussed herein, emphasizes a "click to navigate" design that is intended to remove the need for reviewers to understand and control typical high degree of freedom 3D camera controls such as tumble/pan/zoom controls by dragging or navigation via six degree of freedom devices. For example, rather than navigating via these types of controls to a particular viewpoint, the user finds a shot corresponding to the viewpoint and goes to that viewpoint by a simple single click on its thumbnail. Another benefit of the simple "click to navigate" approach is that this allows non-presenters to be successful in controlling the system and inspecting the design. A final benefit of this simple navigation scheme is that since the system is never displaying awkward viewpoints or jarring visuals no matter who is controlling it, the presenter's design is always portrayed in a polished manner thus enhancing the impact of the presentation and reviewer perception of the design.

The present invention also allows a user to click-on a location in the scene and a shot associated with the location can be played or a view determined. To support this quick shot selection and direct navigation, the invention uses a two-step heuristic. (1) Based on where the user clicked on the model, search neighboring space for shots in the vicinity. (2) Play the shot (or shot set) found, or, if no shots close to the selected spot are found, take no action. Based on a spatial relevance metric (see below for details) the system plays back the most relevant shots.

To facilitate "returning" from a search a user can click one of the thumbnails in the sequencer view. Typically, one particular thumbnail is an overview shot of the 3D object and this serves as the "home" button. This is especially useful if a user is zoomed-in to see surface details and wants to navigate to another region on the object.

Figure 14:
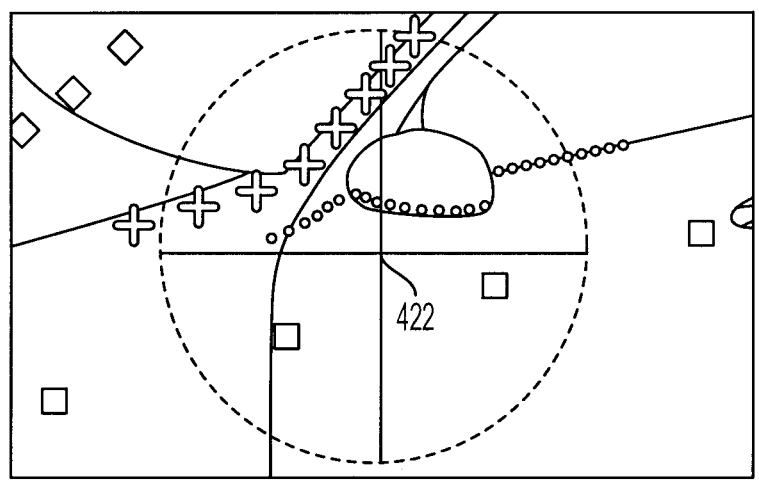
FIG. 14 depicts shots near a user-selected point.
Figure 15:
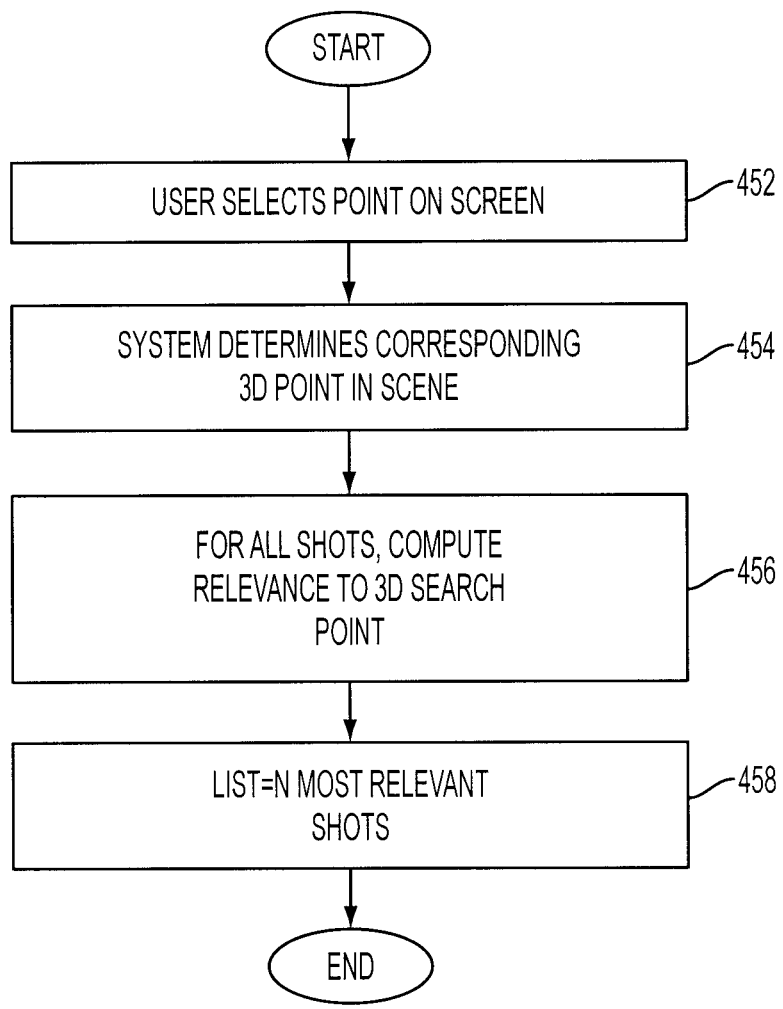
FIG. 15 illustrates search operations for a shot associated with a user-selected point.

The input to the search algorithm is a target point 422 on the model surface (see FIG. 14). This point is derived by casting a ray into the scene from the screen coordinates under the mouse cursor and computing the intersection of this ray with the model. The goal is to find which shots are looking at or near the target point. FIG. 14 shows squares, dots and crosses indicating individual shots and "look at" points and where a dashed target circle shows a search clipping region and target center as an initial user search point. The search algorithm (see FIG. 15) has four operations. For each shot, compute 452 the distance from each of its look-at points (explained below) to the target point. For each shot, compute 454 its relevance, a function of the distances computed in 452. Sort 456 the shots in decreasing order of relevance, discarding those shots with zero relevance. Return 458 the top N most relevant shots.

When a shot is initially created, the system computes a series of look-at points that encode what the shot is looking at (see FIG. 14 where squares, dots and crosses represent look-at points for different shots). The shot is sampled at a fixed frequency, and at each time step a ray is cast from the camera position along the viewing direction and its intersection with the model is computed and stored. The system preferably samples each shot at a rate of 30 frames per second (fps). With an average shot length of about 8 seconds, this would result in approximately 250 sample look-at points per shot. Though the calculation of these intersections is relatively expensive, it need only be performed once, on shot creation and therefore does not interfere with the user experience during a search operation.

Given a target point and a shot's look-at points, the system computes the relevance of the shot. To do this, calculate the distance $d_i$ between each look-at point and the target point. Next, for each $d_i$ we calculate a relevance value $r_i$ from:

$$r_i = f(d_i) = \begin{cases} 0 & d_i > D_{max} \\ \left(\dfrac{d_i}{D_{max}} - 1\right)^2 & \text{otherwise} \end{cases}$$

Note the use of the value $D_{max}$ that is the distance beyond the system effectively ignores shot look-at points by setting their relevance to 0 (see FIG. 14 area outside the target circle is ignored). Finally, a shot relevance $R_{shot}$ is calculated by summing the $r_i$'s of a shot:

$$R_{shot} = \sum_i r_i.$$

Figure 16:
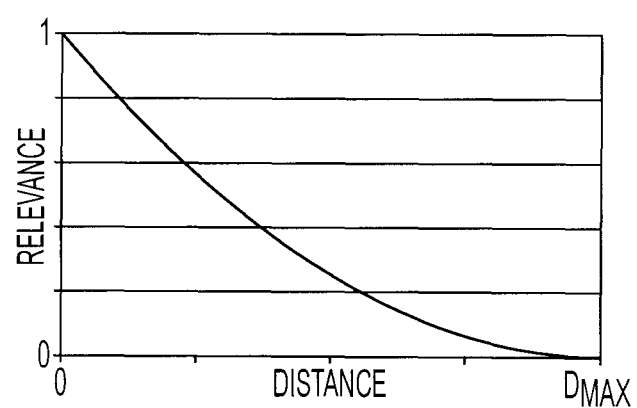
FIG. 16 shows shot relevance as a function of distance.

The graph of FIG. 16 shows how the relevance of a shot look-at point varies as a function of distance from the target point. With a relevance value assigned to each shot, the N most relevant shots are returned. With N=3 the user experiences a small number of highly relevant shots when they clicked on the model. The system can also optionally return the most relevant shot set, which is defined when M of the top N most relevant shots belong to the same set (N=5, M=3 gave good results). Returning the most relevant shot set is most useful in scenes with a large number of authored shots where there may be a dozen shots relating to a given feature like the door handle. In such a scenario, returning the most relevant shot set gives the user a richer experience than simply returning the N most relevant shots.

It is, in general, possible for all shots to have a relevance of zero and the system takes no action in this case.

The above discussion describes executing motion views of a presentation, selected by a user or found during a search. It is also possible to render motion views as high-resolution film quality videos. These rendered views can then be played during a presentation as a substitute for the motion views or intermixed with motion views during the presentation, played when a shot is selected by the user clicking on a shot thumbnail or when a shot is found as a result of a search by substituting a pointer to the motion view with a pointer to the rendered view.

In addition to the pre-specified track, crane, sweep, etc. type shots, the present invention can include other pre-specified shots including an overview shot that provides an overview of a model, a medium view of a model that provides a medium position view of a model and a close-up shot.

Rather than searching for a shot closest to a cursor in a scene, it is possible for the system to search for shots based on metadata, such as the names of parts of the object. For example, a shot could be of an automobile "wheel" and a metadata data search of shots could search for "wheel" shots.

The present invention has been described with respect to the use of the system in a design review of an object or model.

It is also possible to use the present invention in other types of reviews, such as an architectural review. It is also possible to queue up and play audio clips when a motion view is executed by accessing an audio clip stored as part of the metadata for the motion view.

Additional information related to this invention can be found in ShowMotion—Camera Motion based 3D Design Review, by Burtnyk, et al, Association for Computing Machinery (ACM), Mar. 14, 2006. A compact disc is included herewith and incorporated by reference herein having thereon a computer video executable with Microsoft Windows Media Player (TM) presenting a video sequence of an embodiment of the invention.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method, comprising:
   specifying, by an author, a first motion view of a 3D scene indicating a point in the 3D scene to be featured, the first motion view including defining a cinematographic shot along an author specified path, a camera movement and a view of the 3D scene featuring the point;
   determining whether a point in the 3D scene selected by a user, other than the author, is relevant towards presentation of the point to be featured as specified by the author; and
   controlling presentation of the 3D scene to the user using the first motion view featuring the point in correspondence with the camera movement and the view specified by the author, when the determining indicates the point selected by the user is relevant to featuring the point as specified by the author.

2. A method as recited in claim 1, further comprising:
   allowing the author to specify a second motion view; and
   allowing the user to execute the first and second motion views in a sequence.

3. A method as recited in claim 2, further comprising allowing the author to specify a visual transition at an end of the first motion view and at a beginning of the second motion view.

4. A method as recited in claim 2, wherein a display of a view of the scene between an end point of the first motion view and a start point of the second motion view is a viewless transition.

5. A method as recited in claim 2, further comprising allowing the author to specify automatic repeated playing of the first and second motion views.

6. A method as recited in claim 1, further comprising allowing the author to specify one of a view type and a path type.

7. A method as recited in claim 1, further comprising allowing the author to specify a point of interest, comprising a point along the path and a view direction at the point.

8. A method as recited in claim 1, further comprising allowing the author to specify a pace and duration of the first motion view.

9. A method as recited in claim 1, wherein the first motion view has a predefined type path.

10. A method as recited in claim 1, wherein the first motion view has a path curve and view orientations along the path curve interactively drawn by the author.

11. A method as recited in claim 1, further comprising allowing the user to specify the first motion view by selecting a thumbnail image representing the first motion view.

12. A method as recited in claim 2, further comprising allowing the user to specify a set of the first and second motion views to play by selecting a thumbnail image representing the set.

13. A method as recited in claim 12, further comprising locating a motion view associated with the point.

14. A method as recited in claim 13, wherein the locating comprises identifying a closest motion view to the point.

15. A method as recited in claim 13, wherein the locating comprises identifying a motion view that is closest to the point and oriented toward the point.

16. A method as recited in claim 13, wherein the locating comprises identifying N motion views closest to and oriented toward the point.

17. A method as recited in claim 1, further comprising allowing the author to select scene variations for the first motion view.

18. A method as recited in claim 1, wherein the execution of the motion view is automatic.

19. A method as recited in claim 2, wherein the execution of the motion views is automatic.

20. A method as recited in claim 1, wherein the motion view is presented by one of executing the motion view or playing a rendered motion view.

21. A method, comprising:
   specifying, by an author, a set of the first and second motion views to play by selecting a thumbnail image representing the set where each first motion view of a 3D scene includes a cinematographic shot along an author specified path including camera movement and a view in association with the 3D scene;
   allowing the author to specify a pace and duration for each view;
   allowing the author to specify a visual transition at an end of the first motion view and at a beginning of the second motion view;
   allowing the author to specify one of a path type from among predetermined path types for each motion view;
   allowing the author to specify a point of interest for each motion view, comprising a point along the path and a view direction at the point;
   determining whether a point in the 3D scene selected by a viewer, other than the author, is relevant towards presentation of the point of interest as specified by the author; and
   controlling presentation of the motion views to the viewer by transitioning along the paths in sequence according to the path types with the path traversing the points and viewing in the directions and with a viewless cut between the motion views, as specified by the author, when the determining indicates the point selected by the viewer is relevant to the point of interest as specified by the author.

22. A system, comprising:
   a display;
   an input device; and
   a computer configured to execute an operation including:
      specifying, an author, with the input device, a first motion view of a 3D scene by indicating a point in the scene to be featured, the first motion view defining a cinematographic shot along an author specified path including camera movement and a view in association with the 3D scene, determining whether a point in the 3D scene selected by a user, other than the author, is relevant towards presentation of the point to be featured as specified by the author, and controlling presentation of the 3D scene to the user using the first motion view featuring the point in correspondence with the camera movement and the view specified by the author, when the determining indicates the point selected by the user is relevant to featuring the point as specified by the author.

23. A graphical user interface of a device, comprising:
a computer configured to execute an operation including:
   a view of a 3D scene produced by a computer; and
   a thumbnail image representing a motion view of the 3D scene produced by the computer including a cinematographic shot along an author specified path including camera movement and a view in association with the 3D scene featuring a point,
where the operation determines whether a point in the 3D scene selected by a user, other than the author, is relevant towards presentation of a point to be featured in the motion view as specified by the author, and
where a viewer is provided with controlled presentation of the 3D scene using the motion view featuring the point in correspondence with the camera movement and the view specified by an author, when the determining indicates the point selected by the viewer is relevant to featuring the point as specified by the author.

24. An interface as recited in claim 23, further comprising a thumbnail image representing a set of motion views.

25. An interface as recited in claim 23, further comprising thumbnail images representing alternate 3D scenes.

26. An interface as recited in claim 23, further comprising a play control for playing the motion view.

27. An interface as recited in claim 23, further comprising a loop control for repeatedly playing the motion view.

28. A computer readable storage controlling a computer to execute a process comprising:
   specifying, by an author, a first motion view of a 3D scene by indicating a point in the 3D scene to be featured, the first motion view defining a cinematographic shot along an author specified path including camera movement and a view of the 3D scene;

determining whether a point in the 3D scene selected by a user, other than the author, is relevant towards presentation of the point to be featured as specified by the author; and allowing the user to automatically execute the first motion view featuring the point based on controlled presentation of the first motion view in correspondence with the camera movement and the view specified by the author, when the determining indicates the point selected by the user is relevant to featuring the point as specified by the author.

29. A method, comprising:
allowing an author to specify a point in a scene;
locating a view of the scene closest to the point and determining whether a point in the 3D scene selected by a viewer, other than the author, is relevant towards presentation of the point to be featured as specified by the author based on the view closest to the point; and
allowing the author to specify a cinematographic shot along an author specified path including camera movement to feature the point in the scene, and
where a viewer of the shot is provided with controlled presentation of the point featured in correspondence with the camera movement and the view specified by the author, when the determining indicates the point selected by the viewer is relevant to featuring the point as specified by the author.

30. A method, comprising:
specifying, by an author, a visual sequence in a 3D scene by defining a location in the scene to be featured, the visual sequence including a cinematographic shot along an author specified path including camera movement and a view in association with the 3D scene, the author specified path being one of a predefined path, an imported path and an author drawn path;
determining whether a point in the 3D scene selected by a user, other than the author, is relevant towards presentation of the point to be featured as specified by the author; and
controlling a view by the user using the visual sequence in correspondence with the camera movement and the view specified by the author, when the determining indicates the point selected by the user is relevant to featuring the point as specified by the author.

* * * * *

UNITED STATES PATENT AND TRADEMARK OFFICE
CERTIFICATE OF CORRECTION

PATENT NO. : 9,070,402 B2  
APPLICATION NO. : 11/373159  
DATED : June 30, 2015  
INVENTOR(S) : Nicolas Alexandre Burtnyk et al.

It is certified that error appears in the above-identified patent and that said Letters Patent is hereby corrected as shown below:

Claims

Column 9, Line 28, Claim 1, please delete "including".

Signed and Sealed this
Fifth Day of April, 2016

Michelle K. Lee
*Director of the United States Patent and Trademark Office*